March 11, 1958 O. H. WILLIFORD 2,826,640

PERMANENT SIGNAL LOCK-OUT

Filed Dec. 7, 1954 8 Sheets-Sheet 1

INVENTOR
O. H. WILLIFORD
BY C. Mattice
ATTORNEY

PERMANENT SIGNAL LOCK-OUT

Filed Dec. 7, 1954 8 Sheets-Sheet 2

INVENTOR
O. H. WILLIFORD
BY C. Mattice
ATTORNEY

INVENTOR
O. H. WILLIFORD
BY C. Mattice
ATTORNEY

PERMANENT SIGNAL LOCK-OUT

Filed Dec. 7, 1954 8 Sheets-Sheet 4

INVENTOR
O. H. WILLIFORD
BY C. Mattice
ATTORNEY

March 11, 1958 O. H. WILLIFORD 2,826,640

PERMANENT SIGNAL LOCK-OUT

Filed Dec. 7, 1954 8 Sheets-Sheet 5

INVENTOR
O. H. WILLIFORD
BY C. Mattice
ATTORNEY

March 11, 1958 O. H. WILLIFORD 2,826,640

PERMANENT SIGNAL LOCK-OUT

Filed Dec. 7, 1954 8 Sheets-Sheet 6

INVENTOR
O. H. WILLIFORD
BY C. Mattice
ATTORNEY

PERMANENT SIGNAL LOCK-OUT

Filed Dec. 7, 1954 8 Sheets-Sheet 7

INVENTOR
O. H. WILLIFORD
BY C. Mattice
ATTORNEY

INVENTOR
O. H. WILLIFORD
BY C. Mattice
ATTORNEY

United States Patent Office 2,826,640

Patented Mar. 11, 1958

2,826,640

PERMANENT SIGNAL LOCK-OUT

Oscar H. Williford, Bronxville, N. Y., assignor to Bell Telephone Laboratories, Incorporated, New York, N. Y., a corporation of New York Application December 7, 1954, Serial No. 473,506

10 Claims. (Cl. 179—22)

This invention relates to dial telephone systems and has for one of its objects to increase the efficiency with which such systems operate under overload conditions.

More specifically, the present invention relates to crossbar telephone systems such as that disclosed in United States Patent 2,585,904, granted to A. J. Busch on February 19, 1952, and provides supplementary means for disposing of calls under overload conditions.

As disclosed in the Busch patent, there are a number of conditions under which a call cannot be completed, for example, when all of the trunks outgoing to the desired office are busy, when the subscriber dials an unassigned number, when the subscriber does not complete dialing, or when, having initiated a call, the subscriber does not dial at all. This last condition is simulated as a result of troubles which bridge the line conductors and is commonly called a permanent signal condition. Under the above conditions, the marker is arranged to connect the calling line to one of a number of special trunks which provide a trunk-busy tone or a no-such-number tone or, in the case of a permanent signal, connect the line with a permanent signal operator who has various means at her disposal for attracting the attention of the subscriber. A number of trunks of each type will be provided but the number of trunks which would be sufficient for normal operating conditions may be entirely inadequate in emergencies. For example, when an overload condition arises, many subscribers may become impatient and start to dial without waiting for dial tone so that the register, when it is attached, will not receive a complete set of digits and will treat the call as a case of partial dialing. Similarly, a cable failure may result in a large number of permanent signals. Under these conditions, when the number of trunks provided has been exhausted, the register can only be released as a result of a timing operation which further increases the adverse effect of the overload condition.

In accordance with the present invention means is provided whereby when no special signaling trunks are available the line may be connected to a source of signaling current over an auxiliary crosspoint of the line switch.

More specifically, an auxiliary line link connected with a source of tone is provided in the primary line switch and means is provided under the control of the marker to connect a calling line with that line link.

Furthermore, the marker is so arranged that, if it cannot connect the calling line to the proper signaling trunk, it will operate the select magnet associated with the auxiliary line link on the frame on which the calling line appears and then operate the hold magnet individual to the calling line to close the crosspoint connecting the line with the auxiliary line link to provide local line holding. With this crosspoint closed the hold magnet is locked under the control of the calling line and the marker and register may be released to serve other calls.

These, and other features of the invention, may be more clearly understood from consideration of the following description read in connection with the drawing in which.

Figures 1, 8:
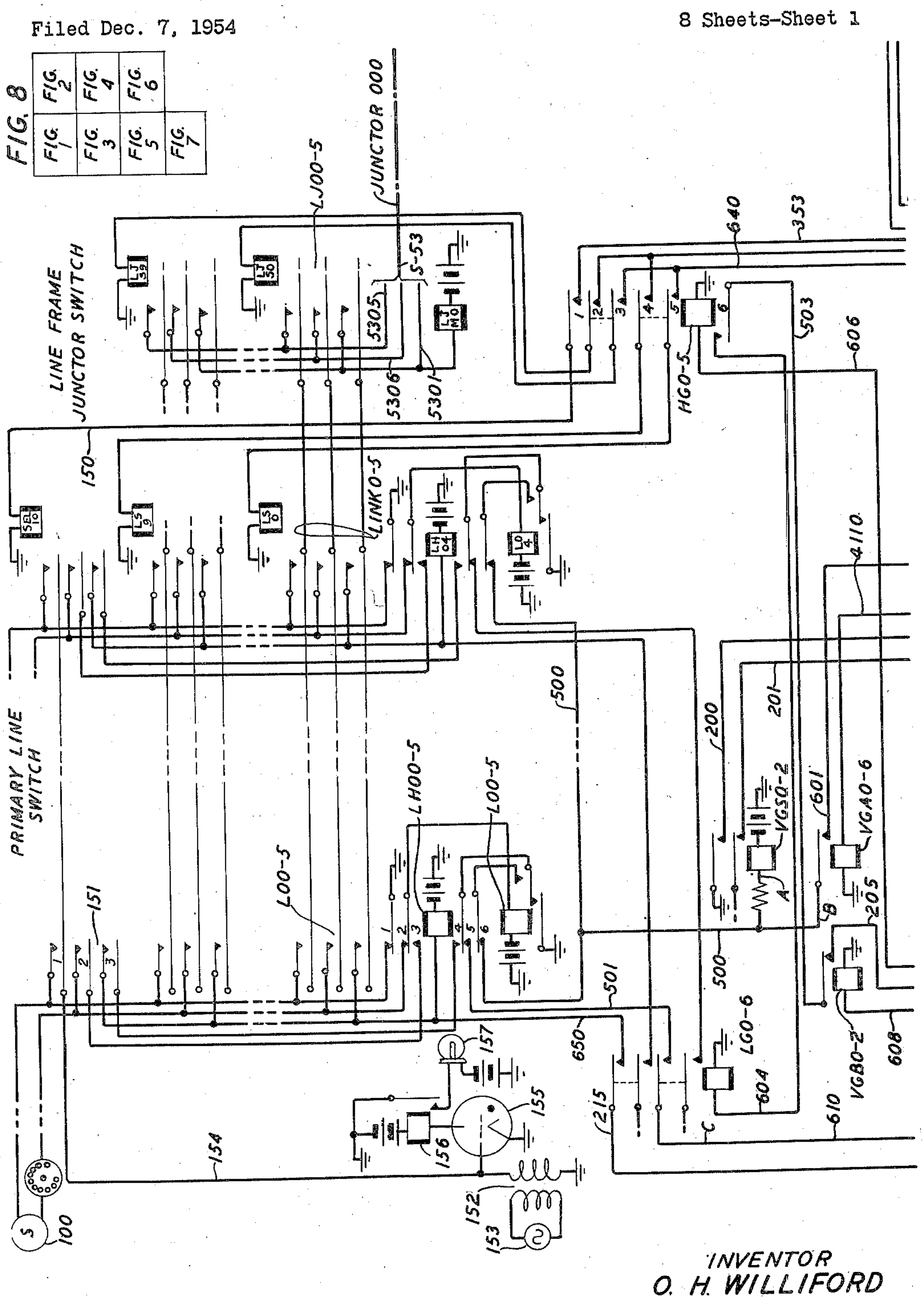
Fig. 1 shows a line link frame including the auxiliary line link.
Figure 2:
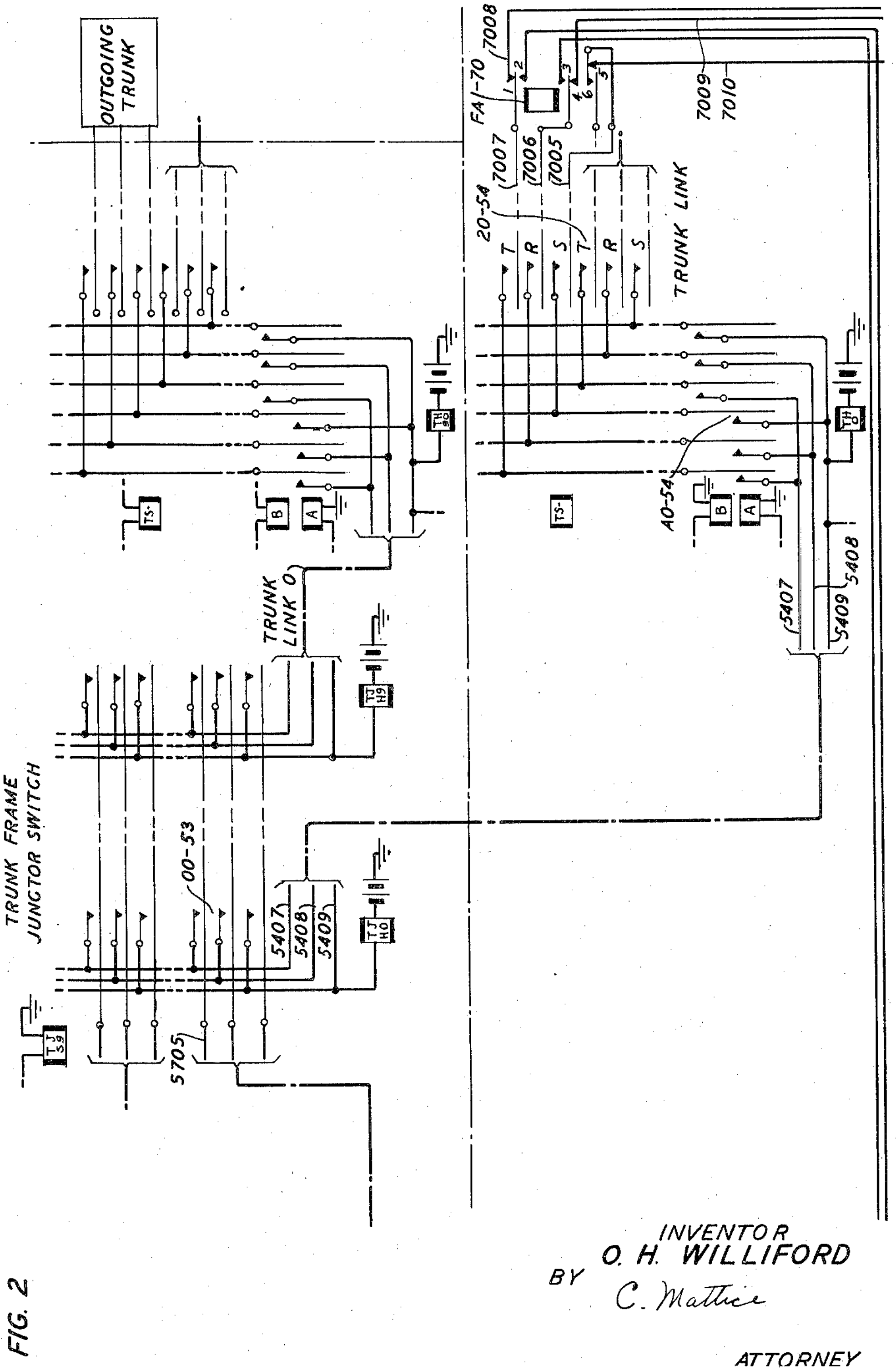
Fig. 2 shows a trunk link frame.
Figure 3:
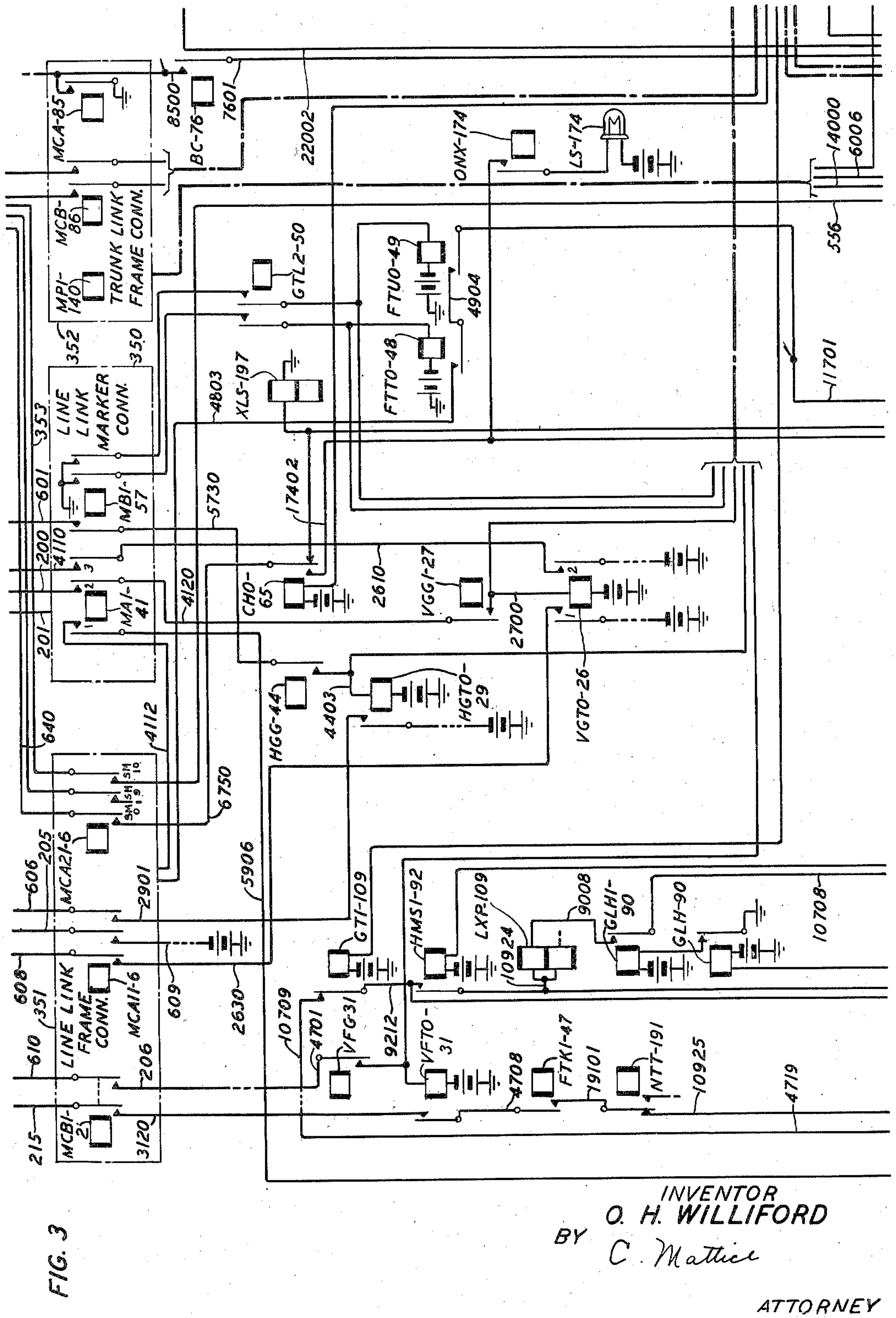
Fig. 3 shows a line link frame connector, a line link marker connector, a trunk link frame connector and a part of the marker including the relays which control selection of the calling line.
Figure 6:
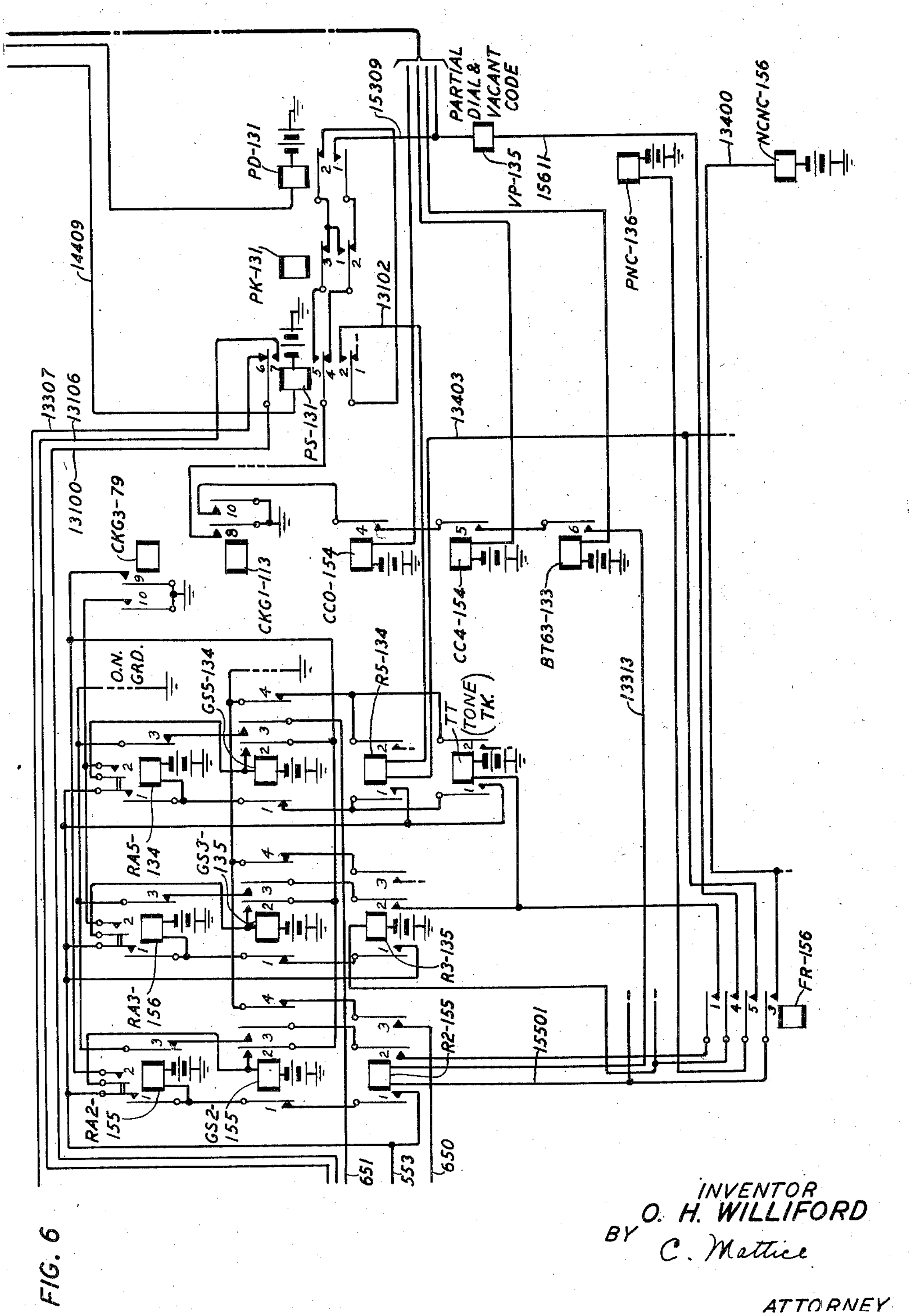
Figure 5:
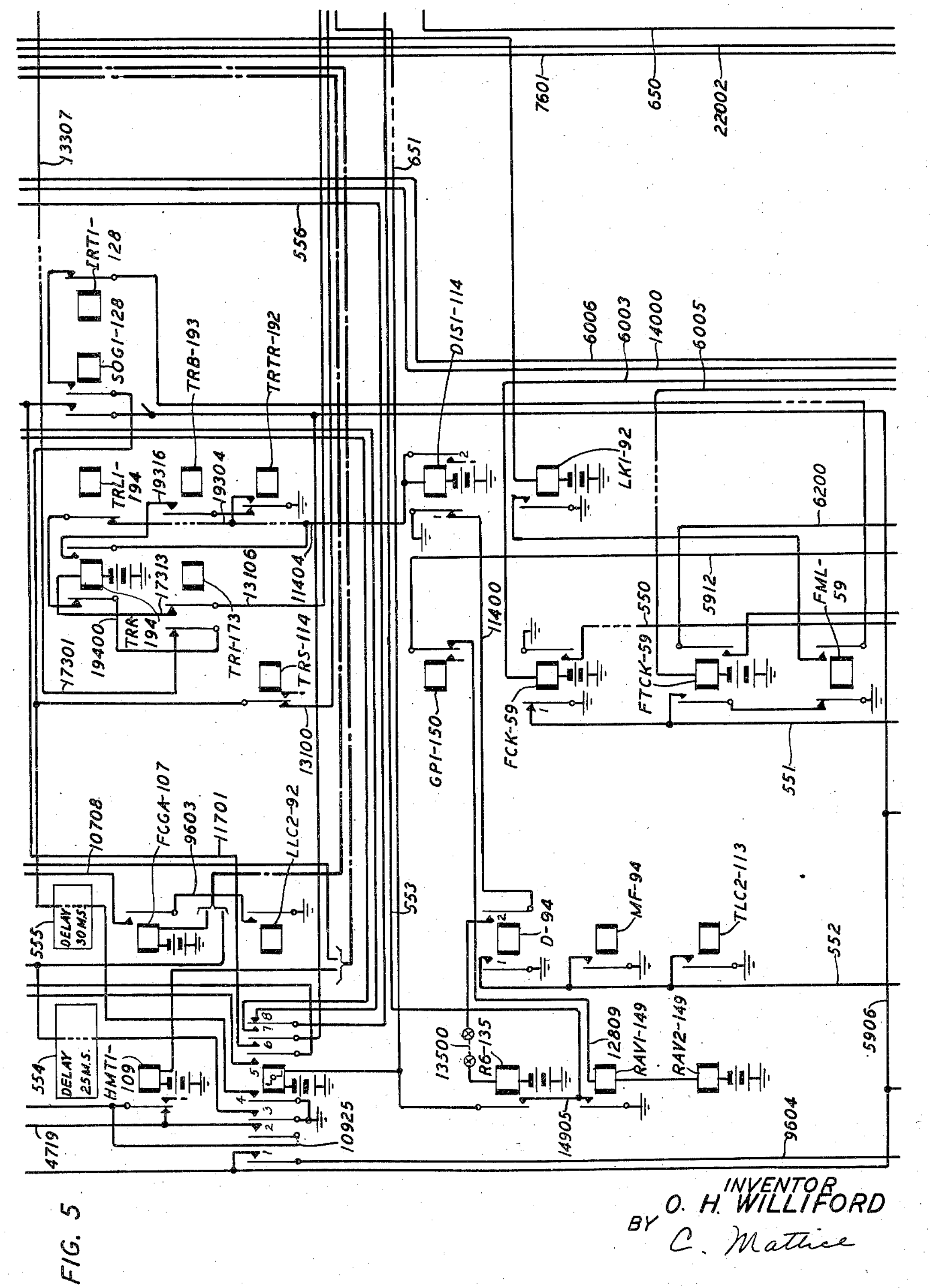
Figure 7:
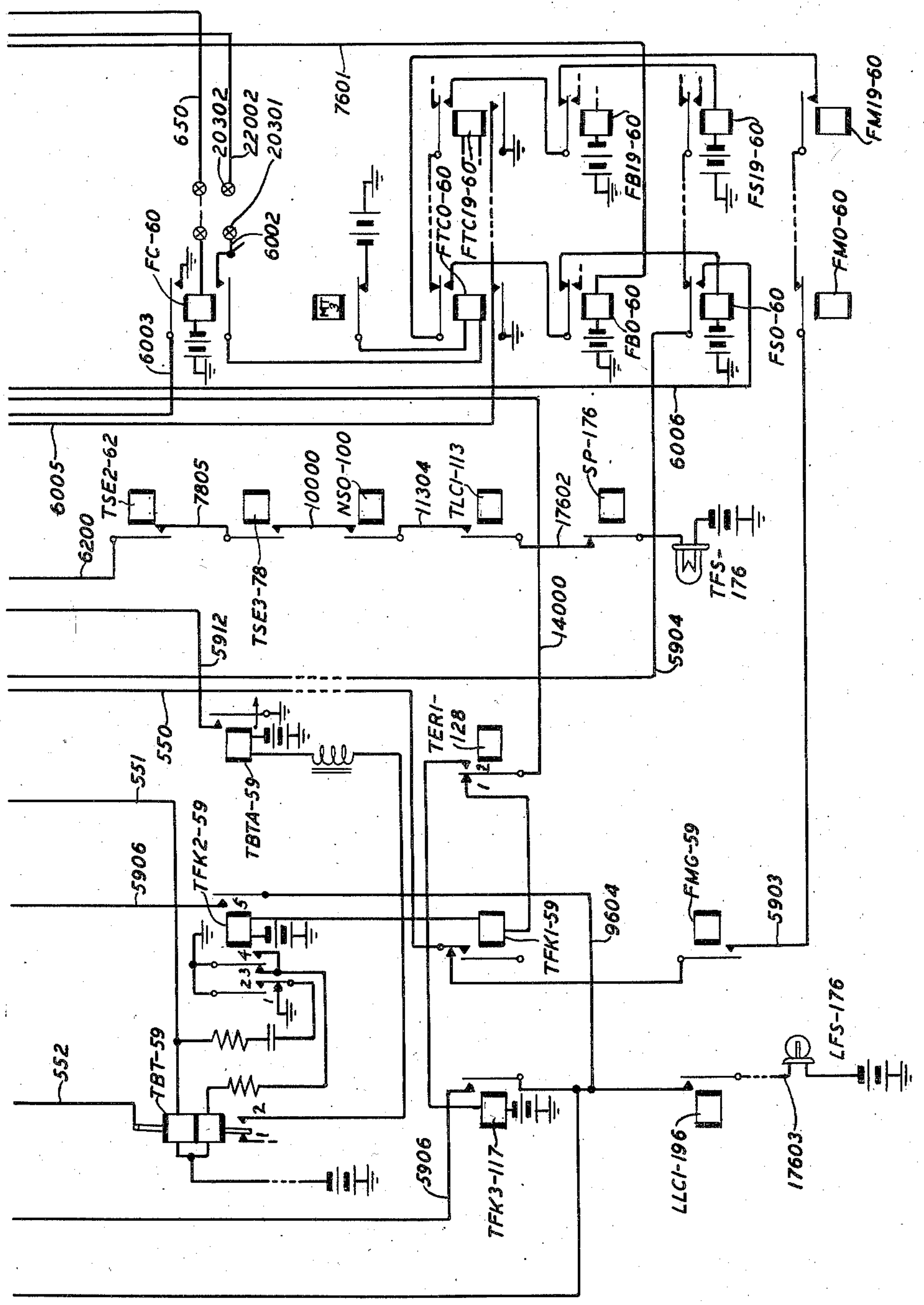

Figs. 5 to 7, inclusive, show additional parts of the marker, Fig. 5 showing the route-advance control relays and the class of call relays, Fig. 6 showing the route relays together with the route-advance relays and ground supply relays and Fig. 7 showing the frame test relays;

Fig. 8 shows the manner in which Figs. 1 to 7 are to be arranged; and

Figure 9:
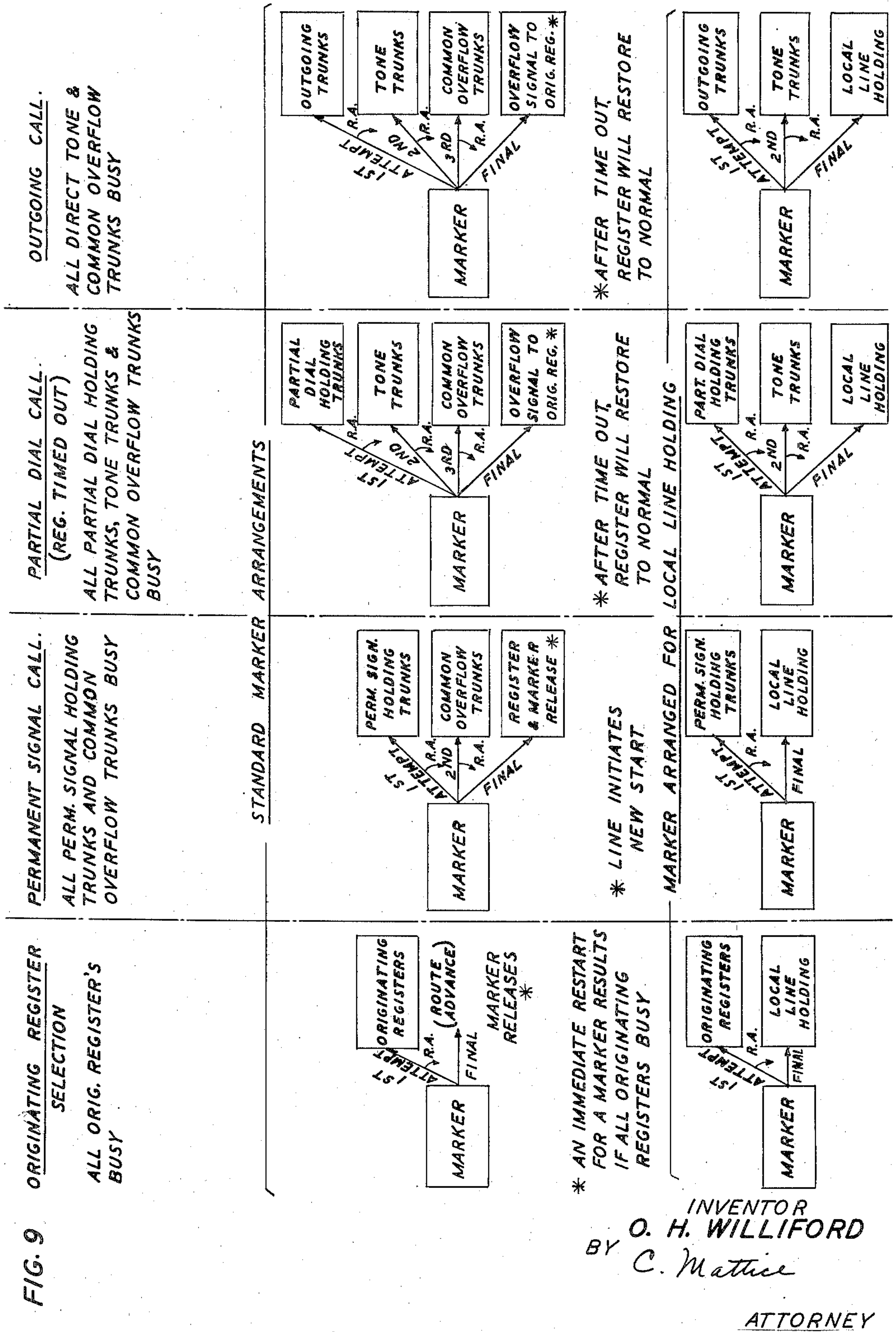

Fig. 9 shows a series of diagrams illustrating route advance in the standard and proposed systems.

The present invention is particularly designed to function with the system disclosed in the above-identified Busch patent and that patent is to be understood as incorporated by reference in the present disclosure. The drawings in general constitute a skeleton showing of the circuits of that patent. For convenience in referring to the Busch patent for further details of the circuit and a complete description of their operation, the same functional letter designations have been used in the present disclosure in combination with a numerical indication of the figures of the Busch patent in which the piece of equipment is shown. Some of the numerical designations for conductors have also been used. Equipment added for the purpose of the present invention will also be given functional letter designations without a numerical indication and additional numerical designations required for conductors, etc. will appear in the second half of the proper hundred to distinguish them from those used in the Busch patent.

As a basis for understanding the present invention the operation of the system under normal conditions will be briefly described.

Figure 4:
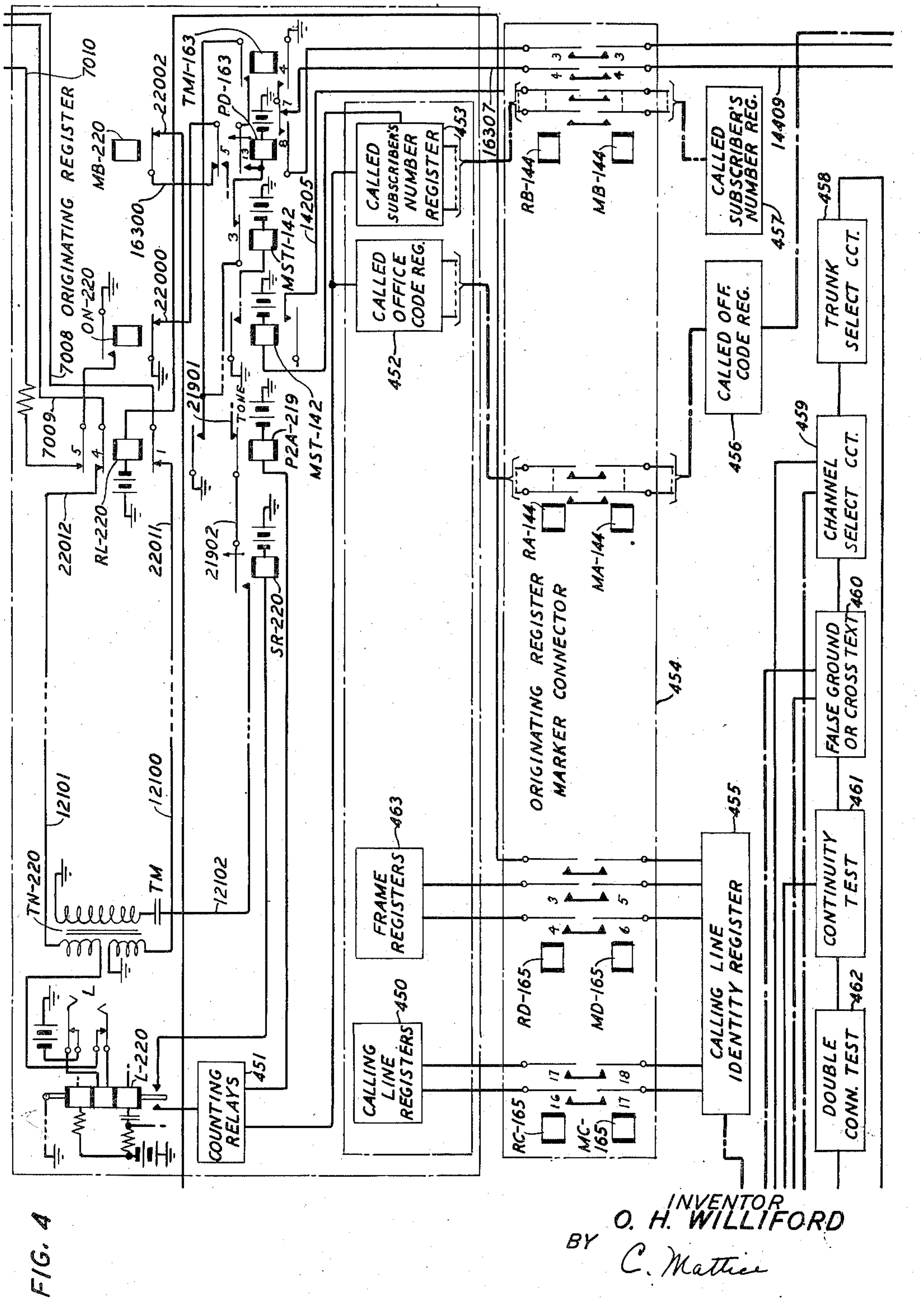
Fig. 4 shows a part of an originating register, the originating register marker connector and a further part of the marker including the calling and called line number registers.

In response to the initiation of a call, a dial tone connection is set up as described in the Busch patent resulting in the connection of the calling line through crosspoints of the primary line switch, line junctor switch, trunk frame junctor switch and trunk link switch to an originating register such as indicated in Fig. 4. During the establishment of this connection the marker identifies the calling line and transfers the registration of the line identity to the originating register, after which the marker releases. When the dial tone connection has been established, the calling line is connected to the winding of relay L–220 which responds to the operation of the subscriber's dial to operate a set of counting relays which in turn operate code and numerical registers in accordance with the designation dialed. When the numerical registers have been set, the originating register operates the originating register marker connector to select an idle marker and connect it with the originating register, whereupon the originating register transfers the calling line identification and the called line designation of the marker. The marker translates the code digits of the called line designation and operates a corresponding route relay. This route relay informs the marker of the type of call, for example, whether it is a local or an outgoing call, and in addition identifies the trunk link frames on which trunks outgoing to the wanted office are located. The marker selects an idle trunk link frame having at least one idle trunk and then, under the control of the route relay, selects an idle trunk.

In the case of a local or intraoffice call, the marker then calls in a number group circuit and transmits to it the numerical designation of the called line, receiving from the number group circuit an indication of the location of the called line. From this indication the marker proceeds to select a line link frame and the called line, tests the called line to determine whether it is idle and, if so, sets up and tests a connection between the called line and the selected intraoffice trunk. It then proceeds to connect the intraoffice trunk with the calling line and releases. In the case of an outgoing call, the selection of a trunk link frame takes place as described above but while this selection is in progress the marker is selecting an outgoing sender of the required type and then selects an idle trunk and connects the selected sender with a selected trunk, after which it completes the connection with the calling line.

Assume now that line 100 has been connected, as above described, to the originating register of Fig. 4 completing a connection from battery through the middle winding of relay L–220, winding of tone coil TN–220, by way of conductor 12101 through equipment (not shown) to conductor 22012, contact 4 of relay RL–220, conductor 7009, contact 4 of relay FA1–70 on the trunk link frame, conductor 7006, through the operated cross points 20–54, A0–54, 00–53, LJ00–5 and L00–5 through the substation 100 back through the crosspoints to conductor 7007, contact 1 of relay FA1–70, conductor 7008, contact 1 of relay RL–220, conductor 22011, through equipment (not shown) to conductor 12100, winding of tone coil TN–220 to ground. Relay L–220 operates in this circuit and closes a circuit for slow release relay SR–220 which closes the dial tone circuit to inform the calling subscriber that he may proceed to dial.

The originating register is provided with a timing means which is started as soon as the register is seized. This timing means is released and restarted as the call proceeds through a normal cycle but if the timing means completes its operation during any stage it operates relay TM1–163 which initiates a series of operations resulting in the operation of relay MST–142 which in turn operates relay MST1–142. If the subscriber starts to dial promptly, the timing circuit is restarted, but if no dialing occurs the condition arises known as a permanent signal condition and the operation of relay MST–142 closes a circuit over conductor 14205 to cause the selection of an idle marker and operates the originating register marker connector 454 to connect the originating register with the selected marker. Relay TM1–163 closes a circuit from ground over its contact 4 and normally closed contact 7 of relay PD–163 to conductor 16307 over contacts of relays RB–144 and MB–144 in the originating register marker connector 454, conductor 14409, to battery through the winding of permanent signal relay PS–131 in the marker.

If the subscriber dials at least one complete digit other than the digit 1, relay P2A–219 is operated under the control of the counting relays 451. Relay P2A–219 closes a circuit for operating the partial-dial relay PD–163. After dialing is completed and the marker start relays MST–142 and MST1–142 are operated in response to the complete operation of the numerical registers 453, the circuit of relay PD–163 is opened, but if the complete designation is not registered by the time that TM1–163 is operated by the timing circuit, relay PD–163 is locked under the control of relay TM1–163 and the marker start relays are operated by the timing circuit to connect the originating register with an idle marker. With relay PD–163 locked operated, a circuit is closed from ground over the contact of relay TM1–163, contact 8 of relay PD–163 through the connector 454 to battery through the winding of relay PD–131 in the marker.

However, if the complete designation is dialed, the operation of the numerical register 453 causes the operation of relay MST–142 and the connection of the originating register with an idle marker by means of the connector 454.

While the dial tone connection is being set up, the marker used for completing that connection determines the identity of the calling line and of the frame on which the calling line was located. After the originating register was selected, the marker transferred the calling line and frame designations to the calling line registers 450 and the frame registers 463 of the selected originating register. Whenever the originating register operates the marker connector 454, it transmits the calling line identity and the frame identity, as registered in registers 450 and 463 to the calling line identity register 455 of the attached marker. After the code registers 452 and the numerical registers 453 of the originating register have been operated, the originating register also transmits these registrations to the code register 456 and the numerical register 457 in the marker.

After these registrations have been transmitted to the marker, the connection between the originating register and the calling line is maintained until the marker has selected a path between the calling line and an idle trunk, at which time the marker operates relay RL–220 to disconnect the originating register from the calling line, but the originating register is held under the control of the marker until the connection has been completed, when both marker and originating register release.

*Route advance*

The operation of the marker in route advancing to the point of local line holding when the various trunk groups are all busy will first be described.

First considering the case of a completely dialed call, the three digits constituting the office code are registered in the code registers 456. Under the joint control of the first two digits registered a relay, such as relay BT63–133, is operated, while two relays, such as relays CC0–154 and CC4–154, are operated from the third digit register. With these relays operated, a circuit is closed for operating a route relay which may be traced from ground at the contact of the off-normal relay CKG1–113, front contacts of relays CC0–154, CC4–154, BT63–154, conductor 13313, winding of route relay R2–155, conductor 15501 over contact 3 of a subscriber class relay such as relay FR–156, conductor 13400 to battery through the winding of the charge control relay NCNC–156. The operation of route relay R2–155 closes a number of circuits for controlling the selection of a trunk outgoing to the desired office.

Only the flat rate class relay FR–156 has been shown but it will be understood that for another class of calling line another class relay will be operated and the winding of route relay R2–155 will be extended to the appropriate charge control relay.

One of the circuits controlled by route relay R2–155 may be traced from ground over contact 4 of ground-supply relay GS2–155, contact 3 of relay R2–155, conductor 650, through suitable cross-connections to battery through the winding of the frame-connect relay FC–60. As described in the Busch patent, trunks are distributed as widely as possible over the trunk link frames. Some groups of trunks may appear on all frames, while small groups of trunks may appear on only a limited number of trunk link frames. A frame-connect relay is provided for each group arrangement and the route relay contacts are cross-connected to operate the proper frame-connect relay. The frame-connect relay FC–60 connects the marker with all frames having trunks outgoing in the direction indicated by the operation of route relay R2–155.

No detailed trunk circuits are shown but each trunk circuit marks a frame test conductor with ground if it is idle and these frame test conductors are connected to cross-connecting terminals such as terminals 20302. The manner in which the originating register marks its associated frame conductor with ground when it is idle may be determined by inspection. The cross-connecting terminals are individual to the trunk route and the frame and are cross-connected to the contacts of the proper frame-connect relay. With relay FC–60 operated, the frame-test conductors of the frames having trunks belonging to route relay R2–155 are connected to the windings of frame-test relays such as relays FTC0–60 to FTC19–60 and the relays corresponding to frames having one or more idle trunks will be operated.

In addition, only one marker can use a trunk link frame at a time and when a trunk link frame is in use, relay MCA–85 in the trunk link frame connector 352 is operated, connecting ground to conductor 8500. Relay BC–76 is operated as soon as the marker is seized and extends conductor 8500 and similar conductors for other trunk link frame connectors to the windings of the frame-busy relays such as relays FB0–60 to FB19–60 so that the frame-busy relays corresponding to busy frame connectors will be operated.

As soon as relay FC–60 operates, checking relay FCK–59 is operated over conductor 6003 to prepare a frame-select circuit. Relays FMG–59, FM0–60 and FM19–60, control a preference circuit and are operated in the manner fully described in the Busch patent. Assuming that relay FM19–60 is operated, that relay FTC0–60 is operated to indicate that the first frame has at least one idle trunk and that relay FB0–60 is not operated to indicate that the trunk link frame-connector associated with the first frame is not in use, relay FCK–59 closes a circuit from ground over its contact 2, conductor 550, normal contact of relay TFK1–59, contact of relay FMG–59, conductor 5903, back contact of relay FM0–60 and of other similar relays, front contact of relay FM19–60, front contact of relay FTC0–60, back contact of relay FB0–60 to battery through the winding of frame-select relay FS0–60.

With any one of the frame test relays FTC0–60 to FTC19–60 operated, check relay FTCK–59 is operated over conductor 6005 so that relay FS0–60 in operating, closes a circuit for operating the trunk link frame connector 352 to permit the marker to complete the connection.

When the marker is seized, a circuit is closed from battry through the upper winding of relay TBT–59, conductor 551 to ground at the back contact of relay FCK–59 and from battery through the lower winding of TBT–59 to ground at a back contact of relay TFK2–59. A branch of the circuit through the upper winding of relay TBT–59 extends through a resistance and condenser to ground at another back contact of relay TFK2–59. With both windings energized relay TBT–59 holds its contact 2 open.

Relay TBT–59 is used for timing the test for a frame having an idle trunk. When relay FCK–59 operates, in response to the operation of frame-connect relay FC–60, it opens the circuit through the upper winding of relay TBT–59 but that relay remains operated for a time interval determined by the charging time for the condenser in the branch circuit. If there is a frame having an idle trunk, as indicated by the operation of relay FTCK–59, as above described, ground is again connected directly to the upper winding of relay TBT–59 over a back contact of relay FML–59 and the front contact of relay FTCK–59 and relay TBT–59 is again energized in the direction to hold its right contact open.

However, if there are no frames available, when the current flow through the upper winding, due to charging the condenser, dies away, the energization of its lower winding causes relay TBT–59 to close its right contact, completing a circuit from ground over the contact of off-normal relay TLC2–113, conductor 552, contact 2 of relay TBT–59 to battery through the winding of relay TBTA–59. Relay TBTA–59 closes a circuit from ground over its right contact, conductor 5912, back contact of relay GP1–150, conductor 12809 to battery through the route advance control relays RAV1–149 and RAV2–149.

Relay RAV1–149 connects ground to conductor 553 completing a circuit over contact 1 of route relay R2–155, contact 1 of ground supply relay GS2–155 to battery through the winding of route advance relay RA2–155. Relay RA2–155 operates in this circuit and locks to ground on conductor 553. With relay RA2–155 operated, a circuit is closed from ground over contact 9 of off-normal relay CKG3–79, contact 2 of relay RA2–155 to battery through the winding of ground supply relay GS2–155. Relay GS2–155 operates and locks to ground at contact 9 of relay CKG3–79 and, in operating, opens the operating circuit for relay RA2–155, the operating circuit for relay FC–60 and other control circuits (not shown).

With relay FC–60 released, the circuit of relay FCK–59 is opened and that relay releases to again connect ground to the upper winding of TBT–59 causing that relay to open its contact 2, in turn releasing relays TBTA–59, RAV1–149, RAV2–149 and RA2–155. As soon as relay RA2–155 releases, a circuit is closed from off-normal ground over contact 3 of relay RA2–155, contact 3 of relay GS2–155, contact 2 of relay RA2–155 and over contact 1 of subscriber class relay FR–156 to battery through the winding of route relay TT. Route relay TT controls the marker to set up a connection between the calling line and a tone trunk which will transmit a tone to the calling line to indicate that all trunks to the desired office are busy. It may be noted that, for some routes, the first route relay to be operated as a result of route advance may provide means for connecting the calling line to an alternate route trunk to the desired office, relay TT being operated only if all of the alternate route trunks are also busy.

In setting up a connection to a tone trunk, relay TT will cause the operation of a frame-connect relay similar to relay FC–60 and the marker will test for a frame having an idle tone trunk in the manner described for testing an outgoing trunk. During periods of overload, all of the tone trunks may also be busy, in which case relay TBT–59 will operate to bring about the operation of relay RAV1–149 and relay RAV2–149, and relay RAV1–149 will again connect ground to conductor 553. At this time relay GS2–155 is operated, opening the previously traced circuit for relay RA2–155 but with relay TT operated, a circuit is closed from ground on conductor 553, contact 1 of relay TT, contact 1 of ground supply relay GS5–134 to battery through the winding of route advance relay RA5–134. Relay RA5–134 operates and locks to conductor 553 and in turn operates relay GS5–134, which locks in a manner similar to relay GS2–155. With relay GS5–134 operated, the operated frame-connect relay is released, in turn bringing about the release of relay RA5–134 in the manner previously described. With relay RA5–134 released, a circuit is closed from off-normal ground over contact 3 of relay RA5–134, contact 3 of relay GS5–124, conductor 651, to battery through the winding of local line holding relay LOL to bring about the connection of the calling line to the auxiliary line link as will be described hereinafter.

It will be remembered that relay PS–131 of the marker is operated when a permanent signal condition is detected by the originating register. With relay PS–131 operated, permanent signal route relay R5–134 is operated in a circuit which may be traced from ground on contact 8 of off-normal relay CKG1–113, contact 5 of relay PS–131, contact 3 of relay PK–131, contact 2 of relay PD–131, contact 2 of relay PS–131, conductor 13102, winding of route relay R5–134, conductor 13403, contact 5 of subscriber class relay FR–156 to battery through the winding of charge relay PNC–136. Relay R5–134 causes the marker to set up a connection between the calling line and a permanent signal trunk to an operator's position, where the operator may take whatever steps are necessary to terminate the permanent signal condition.

If all of the permanent signal trunks are busy, a condition whch may occur as a result of a cable failure, when the marker tests for a trunk link frame having an idle permanent signal trunk, none of the frame-test relays FTC0-60 to FTC19-60 will operate and relay TBT-59 will operate to bring about the operation of the route advance control relays RAV1-149, and RAV2-149 which will connect ground to conductor 553 as previously described.

Route relay R5-134 is served by ground supply relay GS5-134 and therefore when ground is connected to conductor 553, a circuit is closed from ground on that conductor over contact 1 of relay R5-134, contact 1 of relay GS5-134 to battery through the winding of route advance relay RA5-134 which operates and in turn operates relay GS5-134 as the case when all of the tone trunks are busy. With relay GS5-134 operated, the frame-connect relay for the permanent signal trunks is released and relay RA5-134 is released, after which the previously traced circuit for relay LOL is closed.

As previously described, calls which are not completely dialed cause the operation of relay PD-131. Relay PD-131, in operating, closes a circuit from ground over contact 8 of off-normal relay CKG1-113, contact 4 of relay PS-131, contact 2 of relay PK-131, contact 1 of relay PD-131, conductor 15309, winding of the vacant code relay VP-135, conductor 15611, contact 4 of subscriber class relay FR-156, winding of route relay R3-135 to battery. It may be noted that the code registers 456 are arranged to also ground conductor 15309 when the calling subscriber dials an unused code to operate relay R3-135. Route relay R3-135 causes the marker to set up a connection between the calling line and one of a set of trunks extending to an operator's position who can inform the calling subscriber of the reason why the call was not completed.

If all of these operator trunks are busy, the marker will proceed to operate route advance control relay RAV1-149 and relay RAV2-149 as previously described which connect ground to conductor 553. Ground on conductor 553 completes a circuit over contact 1 of route relay R3-135, contact 1 of ground supply relay GS3-135, winding of route advance relay RA3-156 to battery. Relay RA3-156 operates and locks to conductor 553, in turn operating relay GS3-135 which locks under the control of the off-normal relay CKG3-79. With relay GS3-135 operated, the frame-connect relay used for testing for an idle operator trunk is released in the manner previously described, in turn releasing relay RA3-156. With relay RA3-156 released, a circuit is closed from off-normal ground over contact 3 of relay RA3-156, contact 3 of relay GS3-135, contact 2 of relay R3-135 to battery through the winding of tone trunk route relay TT. With relay TT operated, the marker attempts to set up a connection between the calling subscriber and a tone trunk. If all of the tone trunks are busy, the marker again route advances to operate relay LOL as previously described.

Relay LOL is also operated in case the marker is unable to find an idle originating rigister when it is attempting to set up the dial tone connection. The line link marker-connector which connects the line link frame to an idle marker in response to the origination of a call, operates either relay D-94 or relay MF-94 if the calling line is equipped with a dial or a key set for multifrequency pulsing, respectively. With either of these relays operated, a route relay is operated which controls the operation of the marker in setting up the dial tone connection. For example, if relay D-94 is operated, a circuit is closed from ground over contact 1 of disconnect relay DIS1-114, conductor 11400, contact 2 of relay D-94, over a cross-connection 13500 to the winding of route relay R6-135. Relay R6-135 controls the marker in its selection of an idle dial pulse originating register and in setting up a connection between the calling line and the selected register. Relay MF-94 would operate another route relay which would control the marker in selecting an idle multifrequency originating register. Either relay D-94 or relay MF-94 provides ground for operating the route advance control relays RAV1-149 and RAV2-149 if no idle originating register of the proper kind is available. With relay R6-135 operated or the route relay operated by relay MF-94 operated, the operation of relay RAV1-149 operates relay LOL directly over the front contact of the originating register route relay.

Therefore relay LOL is operated whenever it is impossible to connect the calling line to a trunk.

*Local line holding*

In order to more clearly understand the function of the local line holding relay LOL, the manner of obtaining the line location by the marker which sets up the dial tone connection and recording it in the marker which attempts to set up the desired connection will be outlined.

As completely described in the above-identified Busch patent, when a subscriber such as the subscriber at substation 100 removes his receiver to initiate a call, a circuit is closed from ground over the contact 1 of the hold magnet LH00-5 individual to the line, over the line conductors and through the substation 100, contact 2 of hold magnet LH00-5 to battery through the winding of line relay L00-5. Relay L00-5 connects ground over contact 6 of hold magnet LH00-5 to conductor 500, operating vertical group start relay VGS0-2 which marks conductor 201 to initiate the operation of the line link marker-connector 350 to select an idle marker and to connect the line link frame on which the calling line appears with the marker. Relay VGS0-2 also grounds conductor 200. When a marker is seized to set up a dial tone connection, relays VGG1-27, HGG-44, VFG-31 and GTL2-50 are operated to prepare the marker for identifying the calling line. Ground on front contacts of relay MB1-57 in the line link marker-connector operates frame identification relays indicated by relays FTT0-48 and FUT0-49. Ground on conductor 200 is extended over the contact of relay MA1-41 in the connector 350, front contact of relay VGG1-27, conductor 2700 to battery through the winding of relay VGT0-26, which operates to identify the vertical group in which the calling line appears. Relay VGT0-26 closes a circuit from battery over conductor 2610, contact of relay MA1-41 in connector 350, conductor 4110, winding of vertical group relay VGA0-6 to ground. With relay VGA0-6 operated, conductor 500 is extended over conductor 601, contact of relay MB1-57 in connector 350, front contact of relay HGG-44, conductor 4403 to battery through the winding of relay HGT0-29 operating the latter relay to identify the horizontal group in which the calling line appears. Having identified the frame, the vertical group and horizontal group of the calling line, the marker waits to determine whether an idle originating register of the desired type is available. If a register is available, the marker operates a trunk link frame connector such as connector 352 having access to the selected originating register. When the trunk link frame is operated, check relays TFK1-59 and TFK2-59 are operated in a circuit extending over contact 1 of relay TER1-128, conductor 14000 to ground supplied by connector 352. With relay TFK2-59 operated, a circuit is closed from battery through resistance lamp LFS-176, conductor 17603, front contact of off-normal relay LLC1-196, contact 5 of relay TFK2-59, conductor 5906, contact 1 of relay MA1-41 in connector 350, conductor 4112, to the line link frame connector 351 where the marker preference relay is operated and in turn operates multicontact relays MCB1–2, MCA11–6 and MCA21–6. With relay VGT0–126 operated, a circuit is closed from battery over contact 1 of relay VGT0–26, conductor 2630, front contact of relay MCA11–6, conductor 608, to ground through the winding of vertical group relay VGB0–2. With relay HGT0–29 operated, a circuit is closed from battery over the front contact of relay HGT0–29, conductor 2901, contact of relay MCA11–6, conductor 606 to ground through the winding of horizontal group relay HG0–5. With relays VGB0–2 and HG0–5 operated, a circuit is closed from battery supplied by the marker to conductor 609 through the connector 351, conductor 205, over the front contact of relay VGB0–2, conductor 503, contact 6 of relay HG0–5, conductor 604 to ground through the winding of line group relay LG0–6, operating the latter relay. With relay LG0–6 operated, ground is extended from the front contact of relay L00–5, contact 5 of hold magnet LH00–5, conductor 501, front contact of relay LG0–6, conductor 610, through the connector 351, conductors 206 and 4701, front contact of relay VFG–31 to battery through the winding of the vertical file relay VFT0–31.

The marker uses the information stored on these relays to set up the connection between the calling line and the originating register and then passes this registration to the originating register. When the originating register has received the wanted designation and calls in a marker to complete the desired connection, it returns this information to the marker where it is registered in the calling line register 455 which operates relay VFT0–31, HGT0–29, VGT0–26, FTT0–48 and FUT0–49. As previously described, when the marker is connected with a trunk line frame, relay TFK2–59 is operated and a circuit is closed from battery through resistance LFS–176, contact of off-normal relay LLC1–96, conductor 9604, front contact of relay TFK2–59, front contact of class of call relay SOG1–128 or over the contact of a similar class of call relay, conductor 11701, over the contacts of frame units relay FUT0–49, conductor 4904, contact of frame tens relays FTT0–48, conductor 4803, to the marker preference relay of line link frame conductor 351. With connector 351 operated, relays VGB0–2, HG0–5 and LG0–6 are operated as previously described. Relay VFT0–31 prepares the circuit for operating the hold magnet LH00–5.

Certain operations take place during the setting up of a completed connection which are omitted for local line holding. As described in detail in the Busch patent, during the establishment of a connection to a trunk, after the marker has found and selected a trunk link frame having an idle trunk leading to the desired office, it operates the trunk link frame connector 352 which connects the marker with the selected trunk link frame, after which the trunk select circuit 458 operates to select an idle trunk on that frame. When the trunk has been selected, a relay individual to the selected trunk similar to relay FA1–70 is operated. The channel-select circuit 459 is then operated to test for and select an idle channel by which the calling line may be connected to the selected trunk and the proper select and hold magnets are operated with the exception of the line hold magnet. Channel-select relay CH0–65 is shown together with a circuit for operating the select magnets associated with the link 0–5. As a part of the channel testing selection, relays HMS1–92, GLH–90 and GLH1–90 are operated and normally operated relay HMT1–109 is released.

Before proceeding to operate the line hold magnet, the talking conductors through the switches are extended to the false ground and cross test circuit 460. If the false ground and cross test is satisfactory, relay FCGA–107 is operated. With relay FCGA–107 operated, the circuit for operating the hold magnet of the calling line is closed. This circuit may be traced from ground over a contact of off-normal relay LLC2–92, front contact of relay FCGA–107, conductor 10708, front contact of relay GLH1–90, conductor 9008, winding of relay LXP–109, conductor 10924, front contact of relay HMS1–92, conductor 9212, back contact of relay GT1–109, conductors 10709 and 4719, back contact of relay HMT1–109, conductor 10925, back contact of relay NTT–191, conductor 19101, front contact of relay FTK1–47, conductor 4708, front contact of vertical file relay VFT0–31, conductor 3120, through the connector 351, conductor 215, front contact of relay LG0–6, conductor 650, to battery through the winding of hold magnet LH00–5. It may be noted that relay FTK1–47 is operated following the operation of vertical file relay VFT0–31 to indicate that the proper number of relays has been operated in the vertical file register.

The talking conductors leading through the switches to the calling line are now given a continuity test by the continuity test circuit 461 resulting, if the test is satisfactory, in the operation of relay GT1–107. Relay GT1–107 opens the operating circuit for hold magnet LH00–5 which is now held operated through the switches and the trunk link frame connector 352. The double connection test circuit 462 tests for this removal of ground from the circuit of the hold magnet and, if the operation is satisfactory, operates relay LK1–92. Relay FML–59 is operated after the trunk link frame has been selected as a result of a series of operations for changing the frame preference for the next call. Therefore, when relay LK1–92 operates, a circuit is closed from ground over the front contact of relay LK1–92, front contact of relay FML–59, back contact of relay ITR1–128, front contact of relay SOG1–128, back contact of relay TRS–114, conductor 13100, contact 6 of relay PS–131, conductors 13307 and 17301, back contact of relay TR1–172, conductor 19400, back contact of relay TRR–194, back contact of relay TRL1–194, conductors 19304 and 11404, to battery through the winding of relay DIS1–114. The operation of relay DIS1–114 brings about the release of the marker and originating register as completely described in the Busch patent.

When the calling line is to be connected with the auxiliary line link no connection is to be set up through the switches and therefore no trunk link frame need be selected. In consequence, there will be no channel testing and selecting function and none of the tests of an established connection will be made. Nevertheless, the marker must be connected with the line link frame on which the calling line is located.

With relay LOL operated to indicate that the line is to be connected with the auxiliary link, the circuit for selecting and operating the line link frame connector 351 extends from battery through the resistance lamp LFS–176, conductor 17603, front contact of relay LLC1–196, conductor 9604, contact 1 of relay LOL, conductor 5906, contact 6 of relay LOL, conductor 11701, front contact of relay FUT0–49, conductor 4904, front contact of relay FTT0–48, conductor 4803, to the line link frame connector 351. It will be observed that relay LOL supplies links in this circuit which substitute for those normally supplied by relays TFK2–59 and SOG1–128.

With the line link frame connector 351 operated, relays VGB0–2, HG0–5 and LG0–6 are operated as previously described. The circuit for operating the select magnet individual to the auxiliary line link may be traced from battery through resistance lamp LS–174, front contact of relay ONX–174, which is in the nature of an off-normal relay, conductor 17402, contact 7 of relay LOL, conductor 556, front contact of relay MCA21–6 in the connector 351, conductor 353, contact 1 of relay HG0–5, conductor 150 to ground through the winding of select magnet SEL–10. Select magnet SEL–10 operates in this circuit to prepare the crosspoints associated with the auxiliary line link.

It may be observed that the circuit for operating this select magnet is given a standing test for false battery by the connection of the cross detecting relay XLS–197 over contact 8 of relay LOL to conductor 556, when relay LOL is not operated.

In order to insure that the select magnet will have time enough to move its contacts before completing the circuit for the hold magnet, relay LOL closes a circuit through delay circuit 554, which may take any desired form, through the winding of relay GLH–90 to battery, operating relay GLH–90 which in turn operates relay GLH1–90. With relay GLH1–90 operated, a circuit is closed for operating the hold magnet LH00–5 individual to the calling line, which is the same as that previously traced except that relay LOL at its contact 2 closes a shunt around the contact of relay HMT1–109.

With select magnet SEL–10 operated, the operation of hold magnet LH00–5 closes crosspoint 151. With hold magnet LH00–5 operated, the original operating circuit for the line relay L00–5 is opened, but that relay immediately reoperates in a circuit from battery through the winding of relay L00–5, front contact of hold magnet LH00–5, contact 2 of crosspoint 151, through the calling substation 100, contact 1 of crosspoint 151, conductor 154, to ground through the right winding of tone coil 152. With relay L00–5 held operated, hold magnet LH00–5 is locked over contact 3 of crosspoint 151, contact 4 of hold magnet LH00–5 to ground at the front contact of line relay L00–5. In addition, the hold magnet LH00–5 at its contact 6 opens the circuit of relay VGS0–2 so that, when the line relay L00–5 reoperates, relay VGS0–2 cannot operate and no further attempt can be made to seize a marker until the subscriber has restored his receiver or the permanent signal condition has been corrected.

With crosspoint 151 closed, a tone is therefore transmitted from source 153 through tone coil 152 to the substation 100 to inform the subscriber that no connection can be established. Relay L00–5, hold magnet LH00–5 and crosspoint 151 remain operated until the subscriber restores his receiver, at which time they are released. The control grid of gas-filled tube 155 is connected to conductor 154 so that, when the auxiliary link is connected to a subscriber line, tube 155 becomes conducting, operating relay 156 which lights lamp 157 as an alarm signal to indicate that the auxiliary link is being used.

The release of the marker, following the connection of the line to the auxiliary line link, differs according as the operation of relay LOL resulted from a permanent signal condition or from some other trunks-busy condition. With relay PS–131 not operated, relay LOL closes a circuit from ground over its contact 4 through a time delay circuit 555, which provides a delay somewhat greater than delay circuit 554, back contact of relay TRS–114, conductor 13100, contact 6 of relay PS–131, conductors 13307 and 17301, back contact of relay TR1–173, conductor 19400, back contact of relay TRR–194, back contact of relay TRL1–194, conductors 19304 and 11404 to battery through the winding of relay DIS1–114. Relay DIS1–114 brings about the release of the marker and originating register as described in the above-identified Busch patent.

If relay PS–131 is operated, the circuit closed by relay LOL extends as above traced to conductor 13100 and over contact 7 of relay PS–131, conductor 13106, back contact of relay TR1–173, conductor 17313, to battery through the winding of relay TRR–194. Relay TRR–194 initiates the connection of the trouble recorder with this marker and the recording of the identity of the calling line location in the trouble recorder, to enable the maintenance force to determine the cause of the permanent signal and to correct it. When the trouble record has been made, the trouble recorder operates relay TRB–193 which closes a circuit from ground over the back contact of relay TRTR–192, front contact of relay TRB–193, conductor 19316, front contact of relay TRR–194, conductor 14410 to battery through the winding of relay DIS1–114 to bring about the release of the marker.

Fig. 9 shows a series of diagrams comparing the operations, under traffic congestion, of the standard marker shown in the Busch patent with that of a marker equipped for local line holding as disclosed in the present application.

In the Busch arrangement, in the case of a dial-tone call, when no originating registers are available resulting in the operation of the route advance relays, the marker releases, but the calling line remains in calling condition so that a number of futile operations of the line link marker connector and of the marker may occur before a successful dial-tone connection can be completed. With local line holding, if no originating registers are available, the line is connected to the auxiliary line link and the start circuit for the line link marker connector is opened until the calling subscriber has restored his receiver and initiates a new call. The tone signal received by way of the auxiliary line link will probably cause the subscriber to delay the next attempt sufficiently to permit one or more originating registers to become idle.

In the case of a permanent signal, the standard arrangement provides for an initial attempt to connect the line on which the permanent signal occurs to a permanent signal holding trunk. If all of these trunks are busy, the marker route advances to attempt a connection with a common overflow trunk, followed, if all of the overflow trunks are busy, by the release of the marker and originating register. In this case, as in the case of an attempted dial-tone connection, the start circuit for the line link marker connector remains closed and repeated attempts will be made until either a permanent signal holding trunk or a common overflow trunk becomes idle. With local line holding no common overflow trunks are provided and if no permanent signal holding trunk is available, the line is immediately connected with the auxiliary line link and the start circuit for the line link marker connector is opened.

In the case of a partial-dial call, the standard circuits are arranged initially to set up a connection to partial-dial holding trunks. Similarly, for an outgoing call an attempt is made to set up a call to an outgoing trunk. On certain routes the first route advance is to second choice trunks. If no trunks are available for these first attempts the marker route advances first to tone trunks, then to common overflow trunks and finally transmits a signal to the originating register which causes the originating register to transmit an overflow signal to the calling subscriber and if the subscriber fails to release the originating register, times out and then releases. The progression is also similar for intraoffice calls.

With the marker arranged for local line holding in the case of partial-dial calls, intraoffice calls and outgoing calls, the marker makes the usual attempt to connect the calling line with a partial-dial holding trunk, an intraoffice trunk or an outgoing trunk, then makes a first route advance to attempt to set up a connection with a tone trunk and if all tone trunks are busy, route advances a second time to connect the calling line to the auxiliary line link and releases.

It will, therefore, be apparent that the present arrangement has several advantages. The most obvious advantage is that it renders unnecessary the provision of the common overflow trunks thereby also reducing the marker holding time since it permits the omission of one route advance operation. Another advantage lies in the fact that, after the line has been connected with the auxiliary line links the originating register may be released in the normal manner and may immediately return to service without timing out. In the case of dial-tone calls and permanent signal calls, the line and link are held under the control of the calling subscriber and the release of the marker and register does not leave the line link frame in condition to immediately attempt to seize another marker.

What is claimed is:

1. In a telephone system, subscriber lines, a crossbar line switch having a set of crosspoints individual to each of said subscriber lines, a plurality of line links appearing in said crosspoints, the link appearing in one crosspoint of each set being directly connected to a tone source, the other links being connected to other crossbar switches, a common control circuit, means under the control of a calling one of said lines to register in said control circuit the identity of a called line, means in said control circuit normally operated under the control of said registering means to operate one of said crosspoints to extend said one calling line toward said called line over one of said other links, and means in said common control circuit operated if said line can not be extended towards said called line to operate said one crosspoint individual to said one calling line to connect said one calling line to said tone source.

2. In a telephone system, subscriber lines, a crossbar line switch having a set of crosspoints individual to each of said subscriber lines, a plurality of line links appearing in said crosspoints, the link appearing in one crosspoint of each set being directly connected to a tone source, the other links being connected to other crossbar switches, a common control circuit, means under the control of a calling one of said lines to register in said control circuit the identity of a called line, means in said control circuit normally operated under the control of said registering means to operate one of said crosspoints to extend said one calling line toward said called line over one of said other links, means in said common control circuit operated if said line cannot be extended towards said called line to operate said one crosspoint individual to said one calling line to connect said one calling line to said tone source, and means to hold said one crosspoint operated under the control of said one calling line.

3. In a telephone system, subscriber lines, a crossbar line switch having a set of crosspoints individual to each of said subscriber lines, a plurality of line links appearing in said crosspoints, the link appearing in one crosspoint of each set being directly connected to a tone source, the other links being connected to other crossbar switches, a common control circuit, means under the control of a calling one of said lines to register in said control circuit the identity of a called line, trunk circuits leading toward said called line, means in said control circuit normally operated under the control of said registering means to operate one of said crosspoints and said other crossbar switches to connect said one calling line with one of said trunks, and means in said common control circuit operated if all of said trunks are busy to operate said one crosspoint individual to said one calling line to connect said one calling line to said tone source.

4. In a telephone system, subscriber lines, a crossbar line switch having a set of crosspoints individual to each of said subscriber lines, a plurality of line links appearing in said crosspoints, the link appearing in one crosspoint of each set being directly connected to a tone source, the other links being connected to other crossbar switches, a common control circuit, means under the control of a calling one of said lines to register in said control circuit the identity of a called line, trunk circuits leading toward said called line, means in said control circuit normally operated under the control of said registering means to operate one of said crosspoints and said other crossbar switches to connect said one calling line with one of said trunks, means in said common control circuit operated if all of said trunks are busy to operate said one crosspoint individual to said one calling line to connect said one calling line to said tone source, and means to hold said one crosspoint operated under the control of said one calling line.

5. In a telephone system, subscriber lines, a crossbar line switch having a set of crosspoints individual to each of said subscriber lines, a plurality of line links appearing in said crosspoints, the link appearing in one crosspoint of each set being connected directly to a tone source, the other links being connected to other crossbar switches, a common control circuit, means under the control of a calling one of said lines to register in said control circuit the identity of a called line, first trunk circuits leading toward said called line, means in said control circuit normally operated under the control of said registering means to operate one of said crosspoints and said other crossbar switches to connect said one calling line with one of said trunks, a plurality of tone trunks, means in said common control circuit operated if all of said first trunk circuits are busy to operate one of said crosspoints and one of said other switches to connect said calling line to one of said tone trunks, and means operated if all of said tone trunks are busy to operate said one crosspoint individual to said one calling line to connect said one calling line to said tone source.

6. In a telephone system, a subscriber's line, a substation dial connected to said line, a line relay for said line, a crossbar line switch including a plurality of crosspoints and an auxiliary crosspoint individual to said line, a hold magnet for said line switch individual to said line for operating said crosspoints, a tone source connected with said auxiliary crosspoint, other crossbar switches, trunk circuits, a control circuit, means in said control circuit responsive to the initiation of a call at said substation and the operation of said dial to select one of said plurality of crosspoints, operate said hold magnet and operate said other crossbar switches to connect said line with one of said trunk circuits, means in said one trunk circuit for holding said hold magnet operated, means in said control circuit effective if said dial has not been operated within a predetermined interval to select said auxiliary crosspoint and operate said hold magnet to connect said line with said tone source, and means controlled by said auxiliary crosspoint to place said hold magnet under the control of said line relay and said line.

7. In a telephone system, subscriber lines, each line having a hook switch and a dial, a crossbar line switch having a set of crosspoints individual to each of said subscriber lines, other crossbar switches, line links, one of said line links connected directly to a tone source, the other line links connected to said other crossbar switches, said lines and said line links appearing in said crosspoints, means for operating said crosspoints to connect one subscriber's line with one line link, means responsive to the operation of the hook switch on one subscriber's line to cause said line to be connected with a register circuit, means in said register circuit responsive to the operation of the dial on said one line to register the designation of a called line, a common control circuit, means under the control of said register circuit to initiate operation of said control circuit and to transfer said registered designation to said control circuit, trunk circuits leading towards said called line, means in said control circuit normally operated under the control of said transferred designation to operate one of said crosspoints and said other switches to connect said calling line with one of said trunks, and means operated if all of said trunk circuits are busy to operate said one crosspoint to connect said line with said tone source.

8. In a telephone system, subscriber lines, each line having a hook switch and a dial, a crossbar line switch having a set of crosspoints individual to each of said subscriber lines, other crossbar switches, line links, one of said line links connected directly to a tone source, the other line links connected to said other crossbar switches, said lines and said line links appearing in said crosspoints, means for operating said crosspoints to connect one subscriber's line with one line link, register circuits, means responsive to the operation of the hook switch on one subscriber's line to cause said line to be connected with one of said register circuits, means in said one register circuit responsive to the operation of the dial on said one line to register the designation of a called line, a common control circuit, means under the control of said register circuit to initiate operation of said control circuit and to transfer said registered designation to said control circuit, trunk circuits leading towards said called line, means in said control circuit normally operated under the control of said transferred designation to operate one of said crosspoints and said other switches to connect said calling line with one of said trunks, means operated if all of said trunk circuits are busy to operate said one crosspoint to connect said line with said tone source, and means to hold said one crosspoint operated under the control of the operated hook switch of said calling line.

9. In a telephone system, subscriber lines, each line having a hook switch and a dial, a crossbar line switch having a set of crosspoints individual to each of said subscriber lines, other crossbar switches, line links, one of said line links connected directly to a tone source, the other line links connected to said other crossbar switches, said lines and said line links appearing in said crosspoints, means for operating said crosspoints to connect one subscriber's line with one line link, register circuits, means responsive to the operation of the hook switch on one subscriber's line to cause said line to be connected with one of said register circuits, means in said one register circuit responsive to the operation of the dial on said one line to register the designation of a called line, a common control circuit, means under the control of said register circuit to initiate operation of said control circuit and to transfer said registered designation to said control circuit, trunk circuits leading towards said called line, means in said control circuit normally operated under the control of said transferred designation to operate one of said crosspoints and said other switches to connect said calling line with one of said trunks, means operated if all of said trunk circuits are busy to operate said one crosspoint to connect said line with said tone source, means to hold said one crosspoint operated under the control of the operated hook switch of said calling line, means to release said common control means and said register following the operation of said one crosspoint, and means responsive to the operation of said one crosspoint to render said register connecting means unresponsive to the continued operation of the hook switch of said one line.

10. In a telephone system, subscriber lines, each line having a hook switch and a dial, a crossbar line switch having a set of crosspoints individual to each of said subscriber lines, other crossbar switches, line links, one of said line links connected directly to a tone source, the other line links connected to said other crossbar switches, said lines and said line links appearing in said crosspoints, means for operating said crosspoints to connect one subscriber's line with one line link, register circuits, means responsive to the operation of the hook switch on one subscriber's line to cause said line to be connected with one of said register circuits, means in said one register circuit responsive to the operation of the dial on said one line to register the designation of a wanted line, timing means operated if the dial on the calling line is not operated, a common control circuit, means under the control of said register circuit to initiate operation of said control circuit, means to transfer said registered designation to said control circuit, means under the control of said timing means to transmit a signal to said control circuit indicating that the dial on the calling line has not been operated, trunk circuits leading towards said wanted line, means in said control circuit operated under the control of said transferred designation to operate one of said crosspoints and said other switches to connect said calling line with one of said trunks, special signal trunks, means responsive to said signal to operate one of said crosspoints and said other switches to connect said calling line to one of said special signal trunks, and means operated if all of said first trunks or all of said special signal trunks are busy to operate said crosspoint to connect said line with said tone source over said one line link.

References Cited in the file of this patent

UNITED STATES PATENTS

| | | |
|---|---|---|
| 2,591,579 | Michal | Apr. 1, 1952 |
| 2,591,580 | Michal | Apr. 1, 1952 |
| 2,658,109 | Kessler | Nov. 3, 1953 |